(12) United States Patent
Amritphale et al.

(10) Patent No.: US 9,938,414 B2
(45) Date of Patent: Apr. 10, 2018

(54) NANO PHOSPHATIC HYBRID GEOPOLYMERIC CORROSION RESISTANT COATING MATERIAL AND A METHOD OF PREPARATION THEREOF

(71) Applicant: COUNCIL OF SCIENTIFIC & INDUSTRIAL RESEARCH, Rafi Marg, New Delhi (IN)

(72) Inventors: Sudhir Sitaram Amritphale, Madhya Pradesh (IN); Deepti Mishra, Madhya Pradesh (IN); Archana Singh, Madhya Pradesh (IN); Avneesh Anshul, Madhya Pradesh (IN); Satyabrata Das, Madhya Pradesh (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 15/461,900

(22) Filed: Mar. 17, 2017

(65) Prior Publication Data
US 2017/0267870 A1 Sep. 21, 2017

(30) Foreign Application Priority Data
Mar. 18, 2016 (IN) .............................. 201611009447

(51) Int. Cl.
C09D 5/08 (2006.01)
C09D 101/02 (2006.01)
C09D 7/12 (2006.01)
C08K 13/02 (2006.01)

(52) U.S. Cl.
CPC .............. *C09D 5/084* (2013.01); *C09D 5/086* (2013.01); *C09D 7/1216* (2013.01); *C09D 7/1233* (2013.01); *C09D 7/1266* (2013.01); *C09D 101/02* (2013.01); *C08K 13/02* (2013.01)

(58) Field of Classification Search
CPC ...... C09D 5/084; C09D 5/086; C09D 7/1266; C09D 7/1233; C09D 7/1216; C09D 101/02; C08K 13/02
See application file for complete search history.

(56) References Cited
U.S. PATENT DOCUMENTS
9,296,654 B2 * 3/2016 Seo ....................... C04B 28/006
2013/0260043 A1 10/2013 Abdullah et al.

FOREIGN PATENT DOCUMENTS
WO WO-2008-113609 A2 9/2008

OTHER PUBLICATIONS

Akbarzadefh.E et al., "Corrosion Inhibition of Mild Steel in Near Neutral Solution by Kraft and Soda Lignins Extracted from Oil Palm Empty Fruit Bunch", International Journal of Electrochemical Science, 2011, vol. 6, pp. 5396-5416.
Altwaiq et al.,"The role of extracted alkali lignin as corrosion inhibitor", J. Mater. Environ. Sci. (Journal of Materials and Environmental Science), 2011, vol. 2, N 3, pp. 259-270.
Alaneme et al., "Corrosion Inhibition Performance of Lignin Extract of Sun Flower (Tithonia Diversifolia) on Medium Carbon Low Alloy Steel Immersed in $H_2SO_4$ Solution", Leonard Journal of Sciences, 2012, Issue 20, pp. 59-70.
Kirtay Sebahattin, "Characterization of $SiO_2$-$TiO_2$ Hybrid Corrosion Protective Coatings on Mild Steel", Journal of Materials Engineering and Performance , Dec. 2014, vol. 23 (12), pp. 4309-4315.
Akinci Akin, "The Salt Spray Corrosion of Polymer Coating on Steel", The Arabian Journal for Science and Engineering, Jun. 2009, vol. 34, No. 1C, pp. 139-145.
Zhang.Z et al., "Potential application of geopolymers as protection coatings for marine concrete II. Microstructure and anticorrosion mechanism", Applied Clay Science, 2010, vol. 49, pp. 7-12.
R. Suleiman, et al., "Corrosion resistance properties of hybrid organic—inorganic epoxy—amino functionalised polysiloxane based coatings on mild steel in 3.5% NaCl solution", Corrosion Engineering, Science and Technology, the International Journal of Corrosion Processes and Corrosion Control, 2013, vol. 48 (7), pp. 525-529.

* cited by examiner

*Primary Examiner* — Anthony J Green
(74) *Attorney, Agent, or Firm* — Nixon Peabody LLP; Jeffrey L. Costellia

(57) ABSTRACT

The present invention provides a nano phosphatic hybrid geopolymeric corrosion resistant coating material. The tailored precursor of corrosion resistant coating material is obtained by a process involving, together dry grinding of raw materials fly ash, sodium hydroxide, rice husk, tri calcium phosphate and cetyl trimethyl ammonium bromide optionally with sodium silicate, in solid powder form. The developed coating material obtained by adding water to tailored precursor contains nano sized phosphatic compounds of Cancrisilite (sodium aluminum carbonate silicate hydrate), quartz, mullite, heamatite, sodium aluminum silicate, Herschelite (sodium aluminum silicate hydrate), Sucrose, α D-Glucose, Native cellulose, and phenol, responsible for providing improved corrosion resistant properties and adhesion to the mild steel substrates. The geo-polymeric coating material is used as an anti-corrosive, heat resistant coating material on various materials e.g. mild steel substrates.

13 Claims, 1 Drawing Sheet

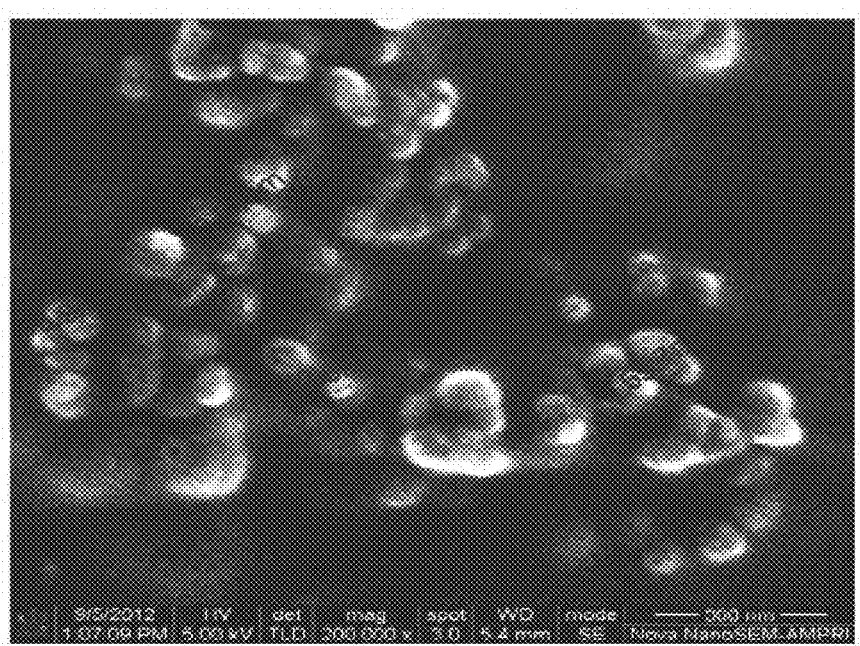

US 9,938,414 B2

NANO PHOSPHATIC HYBRID GEOPOLYMERIC CORROSION RESISTANT COATING MATERIAL AND A METHOD OF PREPARATION THEREOF

The following specification particularly describes the nature of the invention and the manner in which it is to be performed.

FIELD OF THE INVENTION

The present invention relates to a nano phosphatic hybrid geo-polymeric coating material used as anticorrosive, heat resistant coating material on e.g mild steel substrate and the process that enables in obtaining the nano phosphatic hybrid inorganic-organic, multi elemental and multi phases containing geopolymeric corrosion resistant coating material for mild steel substrate. The coating material is obtained by adding water alone to tailored nano phosphatic hybrid inorganic-organic precursor prepared by together mechanico-chemical dry grinding of raw materials fly ash, sodium hydroxide, rice husk, tricalcium phosphate and cetyl trimethyl ammonium bromide with and without sodium silicate in solid powder form.

BACKGROUND OF INVENTION

Mild steel is used for infrastructure applications as well as reinforcement in concrete. It is subjected to adverse environmental conditions such as weathering, ingress of chloride ions etc which causes its corrosion and results in decrease in life of the structure. Various types of organic and inorganic coating materials have been developed, however advanced coating materials with improved properties of corrosion resistance are still in demand.

Reference may be made to article "Corrosion Inhibition of Mild Steel in Near Neutral Solution by Kraft and Soda Lignins Extracted from Oil Palm Empty Fruit Bunch", authored by Ebrahim Akbarzadefh, M. N. Mohamad Ibrahim, Afidah Abdul Rahim, International Journal of Electrochemical Science., 6 (2011) 5396-5416, wherein it is reported that soda and kraft lignin extracted from black liquor of oil palm empty fruit bunch are good inhibitors for mild steel corrosion in 3.5% NaCl at pH 6 and 8 at 25° C. The Soda lignin exhibited better inhibition compared to Kraft lignin at both pH levels and lower efficiency at a higher pH. The drawbacks of the study is that, it is based on only organic compound lignin and is devoid of other organic molecule derived species, silico-aluminous and phosphatic species which exhibit improved corrosion resistance to the substrate. Most important drawback is that, conventional coating approach to protect corrosion of mild steel was not implemented thereby preventing the studies for techno commercial application.

Reference may also be made to the article, "The role of extracted alkali lignin as corrosion inhibitor" authored by Abdel mnim Altwaiq, Sa'ib J. Khouri, Salah Al-luaibi, Robert Lehmann, Heiko Driicker, Carla Vogt, J. Mater. Environ. Sci. 2 (3) (2011) 259-270, wherein the alkali lignin extracted from sawdust of a maple wood tree was found to be good corrosion inhibitor for different alloys viz. Al—Zn alloy, stainless steel, mild steel immersed in HCl solutions. It is also reported that that the inhibition strength depends directly on the concentration of alkali lignin. The drawbacks of the coating material is that, it is based on only lignin based organic matrix and is devoid of multi element containing multi phases. Apart from this, there are no silico-aluminous and phosphatic species which exhibit improved adhesion properties and corrosion resistance to the substrate.

Reference may also be made to the article, "Corrosion Inhibition Performance of Lignin Extract of Sun Flower (Tithonia Diversifolia) on Medium Carbon Low Alloy Steel Immersed in $H_2SO_4$ Solution" authored by K K A laneme, S J Olusegun, Leonardo. Journal of Sciences, 2012, 20, 59-70 wherein, lignin extracted from sunflower was found to be an efficient corrosion inhibitor for medium carbon low alloy steel immersed in 1M $H_2SO_4$ solution. The corrosion rates were observed to decrease with increase in concentration of lignin extract but increase with temperature. The drawbacks of the study is that, it is based on only organic compound lignin and is devoid of other organic molecule derived species, silico-aluminous and phosphatic species which exhibit improved corrosion resistance to the substrate. Most important drawback is that, conventional coating approach to protect corrosion of mild steel was not implemented thereby preventing the studies for techno commercial application.

Reference may also be made to the article, "Characterization of $SiO_2$—$TiO_2$ Hybrid Corrosion Protective Coatings on Mild Steel" authored by Sebahattin Kirtay, Journal of Materials Engineering and Performance Volume 23(12) December 2014-4309 wherein organic-inorganic $SiO_2$—$TiO_2$ alcohol based ormosil solution was applied on a mild steel substrate using sol-gel based dip coating technique. The coating sols were synthesized using Glycidoxy trimethoxy silane ($C_9H_{20}O_5Si$) and titanium tetra isopropoxide ($Ti(OC_3H_7)_4$) as sources for $SiO_2$ and $TiO_2$ respectively. Coatings were subsequently heat treated at 200 and 300° C. to improve the corrosion resistance. The results of this work showed that specimens coated with ormosil sols possessed a higher corrosion resistance than that of uncoated specimen. The drawbacks of the coating material is that, it involves use of commercially available compounds. The developed coating material does not contain phosphate components which are well known for their corrosion inhibition properties. Apart from this, the coating process is based on sol-gel technique and involves additional heat treatment. Thus making it not suitable for commercial applications.

Reference may also be made to the article, "The Salt Spray Corrosion of Polymer Coating on Steel", authored by Akin Akinci, The Arabian Journal for Science and Engineering 1C, 34, 139-145, 2009 wherein salt spray corrosion of polymer coating on steel substrate is reported. The process involves different pretreatments of substrate by different technique like sand blasting, chemical cleaning, and phosphating for in different time periods, followed by coating with an epoxy-polyester layer by electrostatic spray deposition method. The corrosion test was performed in 5% NaCl for over 2000 hours. The best results were obtained for substrate that were sand blasted, phosphated and coated for 3 seconds and it was also observed that polymer coating increases the corrosion resistance of steel substrate. The drawbacks of the coating material is that, commercially available epoxy-polyester compound was used as corrosion inhibitors instead of utilizing naturally occurring plants as source for organic inhibitors. The developed coating material does not contain hybrid inorganic-organic matrix and is devoid of multi element containing multi phases which exhibit improved adhesion properties and corrosion resistance to the substrate.

Reference may also be made to the article, "Potential application of geopolymers as protection coatings for marine concrete II. Microstructure and anticorrosion mechanism" authored by Zuhua Zhang, Xiao Yao, Huajun Zhu, Applied Clay Science 49 (2010) 7-12 wherein the correlations between the microstructure of the metakaolin and granulated blast furnace slag based geopolymers and their low water permeability and high anticorrosion property in sea water were investigated. Results indicated the compact microstructure of geopolymer resulting in its anticorrosion properties. The aluminosilicate geopolymerization products, unlike the hydration products of ordinary Portland Cement, were stable when immersed in sea water or exposed in air, giving marine concrete a chemical protection. It was concluded that metakaolin-based geopolymers have potential to be used as coating materials for marine concrete structures. The drawbacks of the developed coating material composition is that, it is based on inorganic matrix only and is devoid of any organic and phosphatic species which exhibit improved corrosion resistance to the substrate.

Reference may also be made to the article, "Corrosion resistance properties of hybrid organic-inorganic epoxy-amino functionalised polysiloxane based coatings on mild steel in 3.5% NaCl solution" authored by R. Suleiman, M. Mizanurrahman, N. Alfaifi, B. El Ali and R. Akid in Corrosion Engineering, Science and Technology 2013, 48 (7), 525-529 wherein hybrid organic-inorganic coatings have been developed by reacting a mixture of 3-glycidoxypropyltrimethoxysilane and tetraorthosilicat with 2-4% aminoethylaminopropyl-methylsiloxane dimethylsiloxane copolymer as a modifier. The sol-gel polymerisation of the inorganic components was achieved by base catalysation using NaOH. The resultant base coating (CGA) was further modified using two different corrosion inhibitors Molywhite 101-ED and Hfucophos Zapp. The corrosion resistant efficiency of these coatings for the protection of mild steel sheets in 3.5% NaCl electrolyte was assessed using electrochemical methods. Based on the results Molywhite based system appeared to show higher corrosion protection over that of the Hfucophos based system. The drawbacks of the coating material is that, it is based on commercially available compound rather than organic compounds extracted from naturally occurring plants as source of corrosion inhibitors. Further the developed coating material is devoid of phosphatic compounds and silico-aluminous species which provides improved adhesion properties and corrosion resistance to the substrate.

Reference may be made to patent application, "Method of Coating a Geopolymer onto an Article", application Ser. No. 13/656,762 filed on Oct. 22, 2012, Abdullah et al, wherein geopolymer paste prepared from fly ash-derived pozzolanic material and an alkaline activator solution was coated on clay, concrete or metal with an objective to minimize surface deterioration and make them capable of withstanding severe exposure conditions such as high heat and chemical corrosion. The coated articles were cured and sintered at temperature ranging from 100° C. to 1500° C. The drawbacks of the developed coating material is that it does not contain phosphate components and organic compounds derived from natural resources which are well known for their corrosion inhibition properties and also the coating process involves sintering of coated articles at higher temperature. Thus making the whole process energy intensive.

Reference may be made to the patent application, "Geopolymer composition, coating obtainable therefrom and methods", Application number PCT/EP 2008/002342, filing date Mar. 25, 2008, Xuhong Turella Yuanand Yuan Jinghuaet et al wherein the antirust coating was prepared by thoroughly mixing and processing filler particles, micaceous iron oxide, zinc phosphate, zinc oxide, glass scales and water in appropriate proportions. Processed material was then added to film forming geopolymer precursor consisting of aluminosilicate, alkali metal silicate and alkali metal hydroxide. The drawbacks of the developed composition prepared for coating material is that, commercially available compounds were used instead of utilizing naturally occurring plants as source for preparation of anti rust coatings.

Reference may be made to the patent application "Geopolymer precursor dry mixture, package, processes and methods", application number U.S. Ser. No. 12/952,239, filing date Nov. 23, 2010 Chan Han et al wherein geopolymer precursor consisting of dry mixture of metal silicate powder, aluminosilicate powder and alkali. Other supplemental organic and inorganic ingredients were also added to the dry precursor for improving its performance. The developed composition was used for coating applications to variety of substrates such as metal, wood, polymer, ceramics etc. The drawbacks of the developed composition prepared for coating material is that, the geopolymer precursor dry mixture was merely a physical mixture of various constituents and no solid state chemistry was involved, large number of commercially available compounds were used for preparation of coating material, apart from this, no phosphatic compounds were added which provides improved adhesion to the metal substrate and additionally provide corrosion inhibiting properties.

From the above mentioned prior art and based on the drawbacks of the conventional processes, the various issues to be addressed and problems to be solved are as follows:

a) The work so far carried out in the area of development of geopolymeric coating materials is basically restricted and is essentially based on solution chemistry.

b) Absence of together mechanico-chemical dry grinding of raw materials and synergistic and simultaneous solid state reactions among them in conventional geopolymeric system prohibits in tailoring of the developed material for desirable properties.

c) Already existing coating material contains inorganic matrix only. Lack of simultaneous presence of inorganic-organic molecules resulting in development of non homogeneous matrix, poor adhesion and corrosion resistance properties.

To over come these drawbacks, the nano phosphatic hybrid inorganic-organic, multi elemental and multi phases containing geopolymeric corrosion resistant coating material is developed in the present invention. It will be an advancement which will significantly contribute to increase the life of infrastructure based on mild steel by preventing deterioration of their surface due to corrosion.

OBJECTIVE OF THE INVENTION

The main objective of the present invention is to provide a nano phosphatic hybrid inorganic-organic, multi elemental and multi phases containing geo-polymeric corrosion resistant coating material used as an anticorrosive, heat resistant coating material e.g on mild steel substrates.

Another objective of the present invention is to provide a composition of nano phosphatic hybrid inorganic-organic tailored solid precursor material obtained by together mechanico-chemical dry grinding of raw materials fly ash, sodium hydroxide, tri calcium phosphate, rice husk and cetyl trimethyl ammonium bromide with and without sodium silicate.

Still another objective of the present invention is to provide conditions leading to synergistic and simultaneous solid state chemical reactions among raw materials enabling the simultaneous presence of inorganic-organic species in tailored precursor leading to improved adhesion and corrosion resistance properties.

Still another objective of the present invention is to provide desired grade of nano phosphatic tailored precursor material by variation in grinding duration.

Still another objective of the present invention is to provide geopolymeric coating material containing nano sized phosphatic compounds of Cancrisilite (sodium aluminium carbonate silicate hydrate), quartz, mullite, heamatite, sodium aluminium silicate, Herschelite (sodium aluminium silicate hydrate), sucrose, α-D-Glucose, native cellulose, and phenol obtained by adding water alone to the tailored solid precursor material.

Yet another objective of the present invention is to provide, uniform distribution of reacting species leading to homogeneous matrix in developed nano phosphatic hybrid inorganic-organic geopolymeric coating material.

Yet another objective of the present invention is to provide a process for preparation of the geo-polymeric corrosion resistant coating material by mechanic-chemical dry grinding of the raw materials and reacting the precursor so obtained with water to obtain the geopolymeric corrosion resistant coating material.

SUMMARY OF THE INVENTION

Accordingly the present invention provides a nano phosphatic hybrid geopolymeric coating material comprising nano sized phosphatic compounds of Cancrisilite (sodium aluminium carbonate silicate hydrate), quartz, mullite, heamatite, sodium aluminium silicate, Herschelite (sodium aluminium silicate hydrate), sucrose, α-D-Glucose, native cellulose, and phenol.

In another embodiment of the composition, the coating material is obtained by adding water to a tailored precursor, wherein the tailored precursor comprises of nano sized phosphatic compounds of quartz, mullite, hematite, sodium aluminium oxide, sodium aluminium silicate hydrate, sodium silicate, sodium aluminium silicate and α-D-glucose.

In yet another embodiment, the tailored precursor is obtained by together mechano-chemical dry grinding of fly ash in an amount of 70 to 90% by wt., solid sodium hydroxide in an amount of 10 to 15% by wt., rice husk in an amount of 1 to 5% by wt., tri calcium phosphate in an amount of 1 to 5% by wt., cetyl trimethyl ammonium bromide in an amount of 2 to 5% by wt., and optionally sodium silicate in an amount of 5 to 7% by wt.

In yet another embodiment, the particle size of the nano phosphatic hybrid geopolymeric coating material is in the range of 37.1 to 53.7 nm.

In yet another embodiment, the composition posses a adhesion strength in the range of 1.0-2.5 MPa.

In another embodiment, the composition of nano phosphatic hybrid geopolymeric coating material has anti corrosive and heat resistant properties.

In yet another embodiment, the process for making nano phosphatic hybrid geopolymeric coating material, the process comprises steps of:
 (i) mechanico-chemical dry grinding of:
  (a) fly ash in an amount of 70 to 90% by wt.,
  (b) solid sodium hydroxide in an amount of 10 to 15% by wt.,
  (c) rice husk in an amount of 1 to 5% by wt.,
  (d) tri calcium phosphate in an amount of 1 to 5% by wt.,
  (e) cetyl trimethyl ammonium bromide in an amount of 2 to 5% by wt., and
  (f) optionally sodium silicate in an amount of 5 to 7% by wt.; to obtain a tailored precursor; and
 (ii) reacting the tailored precursor with water to obtain the coating material.

In another embodiment of the present invention, the mechanico-chemically dry grinding is performed using a ball mill for a period ranging from 8 to 24 hours.

In another embodiment of the present invention, the tailored precursor is reacted with water in a ratio of 1:3 to obtain the coating material.

In another embodiment of the present invention, A nano phosphatic hybrid geopolymeric coating material as obtained by the process comprising the steps of:
 (i) mechanico-chemical dry grinding of:
  (a) fly ash in an amount of 70 to 90% by wt.,
  (b) solid sodium hydroxide in an amount of 10 to 15% by wt.,
  (c) rice husk in an amount of 1 to 5% by wt.,
  (d) tri calcium phosphate in an amount of 1 to 5% by wt.,
  (e) cetyl trimethyl ammonium bromide in an amount of 2 to 5% by wt., and
  (f) optionally sodium silicate in an amount of 5 to 7% by wt.; to obtain a tailored precursor; and
 (ii) reacting the tailored precursor with water to obtain the coating material.

In still another embodiment of the present invention, nano phosphatic hybrid geopolymeric coating material is obtained by the process comprising the steps of:
 (i) mechanico-chemical dry grinding of:
  (a) fly ash in an amount of 70 to 90% by wt.,
  (b) solid sodium hydroxide in an amount of 10 to 15% by wt.,
  (c) rice husk in an amount of 1 to 5% by wt.,
  (d) tri calcium phosphate in an amount of 1 to 5% by wt.,
  (e) cetyl trimethyl ammonium bromide in an amount of 2 to 5% by wt., and
  (f) optionally sodium silicate in an amount of 5 to 7% by wt.; to obtain a tailored precursor; and
 (ii) reacting the tailored precursor with water to obtain the coating material.

In still another embodiment of the present invention, a corrosion and heat resistant coating material is obtained by the process of comprising the steps of:
 (i) mechanico-chemical dry grinding of:
  (a) fly ash in an amount of 70 to 90% by wt.,
  (b) solid sodium hydroxide in an amount of 10 to 15% by wt.,
  (c) rice husk in an amount of 1 to 5% by wt.,
  (d) tri calcium phosphate in an amount of 1 to 5% by wt.,
  (e) cetyl trimethyl ammonium bromide in an amount of 2 to 5% by wt., and
  (f) optionally sodium silicate in an amount of 5 to 7% by wt.; to obtain a tailored precursor; and
 (ii) reacting the tailored precursor with water to obtain the coating material.

In still another embodiment of the present invention, a corrosion and heat resistant substrate, wherein the substrate is coated with the coating material comprising nano sized phosphatic compounds of Cancrisilite (sodium aluminium carbonate silicate hydrate), quartz, mullite, heamatite, sodium aluminium silicate, Herschelite (sodium aluminium silicate hydrate), sucrose, α-D-Glucose, native cellulose, and phenol.

In still another embodiment of the present invention, a corrosion and heat resistant substrate is coated with the coating material obtained by the process of comprising the steps of:
(i) mechanico-chemical dry grinding of:
  (a) fly ash in an amount of 70 to 90% by wt.,
  (b) solid sodium hydroxide in an amount of 10 to 15% by wt.,
  (c) rice husk in an amount of 1 to 5% by wt.,
  (d) tri calcium phosphate in an amount of 1 to 5% by wt.,
  (e) cetyl trimethyl ammonium bromide in an amount of 2 to 5% by wt., and
  (f) optionally sodium silicate in an amount of 5 to 7% by wt.; to obtain a tailored precursor; and
(ii) reacting the tailored precursor with water to obtain the coating material.

In still another embodiment of the present invention, a nano phosphatic hybrid geopolymeric coating material as obtained by reacting a tailored precursor with water, wherein the tailored precursor is obtained by together mechano-chemical dry grinding of fly ash in an amount of 70 to 90% by wt., solid sodium hydroxide in an amount of 10 to 15% by wt., rice husk in an amount of 1 to 5% by wt., tri calcium phosphate in an amount of 1 to 5% by wt., cetyl trimethyl ammonium bromide in an amount of 2 to 5% by wt., and optionally sodium silicate in an amount of 5 to 7% by wt.

In still another embodiment of the present invention, coated plates were dried at room temperature for 6-8 hours and cured in hot air oven at 60-80° C. for a period of 8 to 12 hours duration.

In still another embodiment of the present invention, coated plates were removed from the hot air oven and were tested for their, a) adhesion strength and b) corrosion resistance using standard practices.

BRIEF DESCRIPTION OF THE FIGURES

The FIGURE shows the FESEM image of the geopolymeric nanoparticle showing the particle size of the nanoparticle in the range of 37.1 to 53.7 nm.

DETAILED DESCRIPTION OF THE INVENTION

The present invention relates to a nano phosphatic hybrid geopolymeric corrosion resistant coating material used as an anti corrosive, heat resistant coating material on e.g mild steel substrate, with raw materials selected from fly ash (Satpura Thermal Power Plant located at Sarni town near Ghoradongri Railway station in Betul district of Madhya Pradesh, India), rice husk (Narmada Cereal Pvt. Ltd., Plot no D2 & 3, Industrial Area Phase-II Mandideep-462046; Distt Raisen (M.P.)) solid sodium hydroxide, cetyl trimethyl ammonium bromide and tri calcium phosphate with or without additionally including solid sodium silicate. The geopolymeric coating material is prepared by a process in which the raw materials are mechanico-chemically dry grinded together using a ball mill and the tailored nano phosphatic hybrid inorganic-organic precursor, so obtained is reacted with water alone. The obtained samples are tested for their, a) adhesion strength and b) corrosion studies. Tailored nano phosphatic hybrid inorganic-organic precursor, is obtained by together mechano-chemical dry grinding of components fly ash, solid sodium hydroxide, rice husk, tri calcium phosphate, cetyl trimethyl ammonium bromide, and optionally sodium silicate. For together mechano-chemical dry grinding of around 1850-2000 grams of raw material in a ball mill of 10 kg capacity, six balls each of mass 350 g and 50 mm diameter were used. Period of grinding varies from of 8 to 24 hours.

The present invention essentially provides:
(i) Development of multi elemental and multi phases containing nano phosphatic hybrid inorganic-organic geopolymeric corrosion resistant coating material for mild steel substrate.
(ii) The corrosion resistant coating material made by the process that involves together mechanico-chemical dry grinding of appropriate combination of raw materials-fly ash, sodium hydroxide, rice husk, tri calcium phosphate and cetyl trimethyl ammonium bromide with or without sodium silicate resulting in synergistic and simultaneous solid state reactions among them by varying grinding durations.
(iii) The process resulting in formation of tailored nano phosphatic hybrid inorganic-organic precursor of coating material with desired functionalities.
(iv) The novel process enables in obtaining nano sized phosphatic compounds of Cancrisilite (sodium aluminium carbonate silicate hydrate), quartz, mullite, hematite, sodium aluminium silicate, Herschelite (sodium aluminium silicate hydrate), Sucrose, α-D-Glucose, native cellulose and phenol in geopolymeric coating material which provides improved corrosion resistant properties and adhesion to the mild steel substrate.

Novelty of the Invention

The novelty of the present invention with respect to prior art lies in the fact that the composition of the geopolymeric coating material is novel and the process of the present invention obviates the drawbacks of existing coating material system by the use of tricalcium phosphate as a source of phosphate ion and rice husk as a source of organic components. The together mechanico-chemical dry grinding of the raw materials-fly ash, sodium hydroxide, rice husk, tri calcium phosphate and cetyl trimethyl ammonium bromide with and without sodium silicate in appropriate combinations and grinding duration, resulting in synergistic and simultaneous solid state chemical reactions among them leading to the formation of tailored nano phosphatic hybrid inorganic-organic precursor. The coating material obtained by adding water alone to tailored precursor material containing nano sized phosphatic compounds of Cancrisilite (sodium aluminium carbonate silicate hydrate), quartz, mullite, hematite, sodium aluminium silicate, Herschelite (sodium aluminium silicate hydrate), Sucrose, α-D-Glucose, native cellulose and phenol, provides improved corrosion resistant properties and adhesion to the mild steel substrate. The geopolymeric nano particle coating material is anti corrosive with additional heat resistant properties.

Tailored nano phosphatic hybrid inorganic-organic precursor is solid powder obtained by together mechano-chemical dry grinding of components fly ash, solid sodium hydroxide, rice husk, tri calcium phosphate, cetyl trimethyl ammonium bromide, and optionally sodium silicate. During dry grinding solid state reactions takes place. By adding water alone to this precursor, tailored geopolymeric coating material is formed which is in form of slurry and used for coating purpose. During formation of tailored geopolymeric coating material, reaction takes place in solution state due to addition of water.

Definitions

Tailored precursor is solid powder obtained by together mechano-chemical grinding of components fly ash, solid sodium hydroxide, rice husk, tri calcium phosphate, cetyl trimethyl ammonium bromide, and optionally sodium silicate.

It is called precursor because it contain some of phases which are present in nano phosphatic hybrid geo-polymeric coating material such as nano sized phosphatic compounds of quartz, mullite, hematite, sodium aluminium oxide, sodium aluminium silicate hydrate, sodium silicate, sodium aluminium silicate and α-d-glucose which are obtained by solid state chemical reactions that takes place during together mechanochemical dry grinding of components fly ash, solid sodium hydroxide, rice husk, tri calcium phosphate, cetyl trimethyl ammonium bromide, and optionally sodium silicate.

After adding water to tailored precursor complete geopolymerisation takes place resulting in formation of nano phosphatic hybrid geo-polymeric coating material containing nano sized phosphatic compounds of Cancrisilite (sodium aluminium carbonate silicate hydrate), quartz, mullite, heamatite, sodium aluminium silicate, Herschelite (sodium aluminium silicate hydrate), Sucrose, α D-Glucose, Native cellulose, and phenol which eventually produce the corrosion resistant material.

It is called tailored precursor because this can obtain desired property in geopolymeric coating material by varying quantity of components fly ash, solid sodium hydroxide, rice husk, tri calcium phosphate, cetyl trimethyl ammonium bromide, and optionally sodium silicate.

Tailored precursor composition—Composition of present invention relates to raw fly ash, sodium hydroxide, rice husk, tri calcium phosphate and cetyl trimethyl ammonium bromide with and without sodium silicate to prepare geopolymeric coating material.

Composition of present invention refers to the composition obtained by adding water to tailored precursor composition and contains nano sized phosphatic compounds of Cancrisilite (sodium aluminium carbonate silicate hydrate), quartz, mullite, hematite, sodium aluminium silicate, Herschelite (sodium aluminium silicate hydrate), Sucrose, α-D-Glucose, native cellulose and phenol.

EXAMPLES

The following example is given by way of illustration of the working of the invention in actual practice and therefore should not be construed to limit the scope of the present invention.

Example 1

For making tailored precursor material, fly ash (1650 gms), solid sodium hydroxide (200 gins), rice husk (16.5 gms), tricalcium phosphate (16.5 gins) and cetyl trimethyl ammonium bromide (56.4 gins) were dry grounded together using a ball mill for a period of 8 hours. The 200 gms of so obtained tailored precursor material was reacted with 100 ml water alone for development of coating material. The obtained coating material was coated on mild steel plates of size 50 mm×60 mm×1.04 mm by spray coating technique. The coated plates were dried at room temperature for a period of 6 hours and cured in an air oven at 60° C. for a period of 8 hours. Thereafter, the coated plates were removed from the hot air oven. The samples so obtained were tested for their, a) adhesion strength and b) corrosion studies. Adhesion studies were carried out using Elcometer 106 and Adhesion strength was found to be 1.2±0.2 MPa.

Corrosion studies were carried by weight loss method in 3.5% aqueous NaCl solution and corrosion rate of coated mild steel plate was found to be 3.10 mmpy as against uncoated mild steel that showed the corrosion rate of 7.51 mmpy. Corrosion studies were further carried out using electrochemical technique. Anodic polarization curves were recorded in 3.5 wt % NaCl using coated plates as working electrode, Ag/AgCl as reference electrode and platinum sheet as counter electrode. The curves were recorded from −1 to 0.5 Volts Vs Ag/AgCl at scan rate of 0.1 volt per second. At constant potential of 0.2 V vs Ag/AgCl, coated plates showed current density of ~1×10$^{-6}$ A/cm$^2$ as against uncoated plates that showed current density of ~1 A/cm$^2$.

Example 2

For making tailored precursor material, fly ash (1650 gms), solid sodium hydroxide (200 gms), rice husk (18.5 gms), tricalcium phosphate (18.5 gms) and cetyl trimethyl ammonium bromide (37 gms) were dry grounded together using a ball mill for a period of 8 hours. The 200 gms of so obtained tailored precursor material was reacted with 100 ml water alone for development of coating material. The obtained coating material was coated on mild steel plates of size 40 mm×50 mm×1.04 mm by spray coating technique. The coated plates were dried at room temperature for a period of 6 hours and cured in an air oven at 60° C. for a period of 8 hours. Thereafter, the coated plates were removed from the hot air oven. The samples so obtained were tested for their, a) adhesion strength and b) corrosion studies. Adhesion studies were carried out using Elcometer 106 and Adhesion strength was found to be 1.0±0.2 MPa.

Corrosion studies were carried by weight loss method in 3.5% aqueous NaCl solution and corrosion rate of coated mild steel plate was found to be 2.15 mmpy as against uncoated mild steel that showed the corrosion rate of 7.51 mmpy.

The electrochemical measurements of coated specimens were performed by measuring variation of open circuit potential (OCP) ($E_{ocp}$) with time. Tafel polarization curves were plotted and electrochemical impedance spectroscopic (EIS) studies were carried out in a 3.5 weight % NaCl solution using CHI604C potentistat. The analyses were carried out at room temperature in a standard electrochemical cell equipped with a frequency response analyzer module. A three-electrode cell including a Platinum electrode as a counter electrode, sliver-silver chloride (Ag/AgCl) electrode as reference electrode and the specimens as a working electrode were used in the experiments. The Tafel polarization curves were obtained from potentiodynamic polarization at a constant scan rate 1 mV/s by sweeping the potential between +250 and −250 mV from OCP. EIS measurements were carried out from OCP with an AC voltage amplitude of 10 mV and a frequency range of 100.000 to 0.01 Hz (ten points were measured for each decade of frequency). Free corrosion potential measurements were completed after 2 h and then polarization resistance was measured. Results indicated that corrosion rate of coated mild steel plate with developed composition was found to be 0.099 mmpy as against fly ash coated mild steel plate that showed the corrosion rate of 0.15 mmpy. $I_{corr}$ (A/cm$^2$) of coated mild steel plate with developed composition was found to be 7.78×10$^{-6}$ as against fly ash coated mild steel plate that showed the $I_{corr}$ (A/cm$^2$) value of 2.9×10$^{-5}$.

Example 3

For making tailored precursor material, fly ash (1650 gms), solid sodium hydroxide (200 gms), rice husk (18.5 gms), tricalcium phosphate (46.25 gms) and cetyl trimethyl ammonium bromide (37 gms) were dry grounded together using a ball mill for a period of 8 hours. The 200 gms of so obtained tailored precursor material was reacted with 100 ml water alone for development of coating material. The obtained coating material was coated on mild steel plates of size 40 mm×50 mm×1.04 mm by spray coating technique. The coated plates were dried at room temperature for a period of 6 hours and cured in an air oven at 60° C. for a period of 8 hours. Thereafter, the coated plates were removed from the hot air oven. The samples so obtained were tested for their, a) adhesion strength and b) corrosion studies. Adhesion studies were carried out using Elcometer 106 and Adhesion strength was found to be 2.0±0.2 MPa.

Corrosion studies were carried by weight loss method in 3.5% aqueous NaCl solution and corrosion rate of coated mild steel plate was found to be 1.01 mmpy as against uncoated mild steel that showed the corrosion rate of 7.51 mmpy.

The electrochemical measurements of coated specimens were performed by measuring variation of open circuit potential (OCP) ($E_{ocp}$) with time. Tafel polarization curves were plotted and electrochemical impedance spectroscopic (EIS) studies were carried out in a 3.5 weight % NaCl solution using CHI604C potentistat. The analyses were carried out at room temperature in a standard electrochemical cell equipped with a frequency response analyzer module. A three-electrode cell including a Platinum electrode as a counter electrode, sliver-silver chloride (Ag/AgCl) electrode as reference electrode and the specimens as a working electrode were used in the experiments. The Tafel polarization curves were obtained from potentiodynamic polarization at a constant scan rate 1 mV/s by sweeping the potential between +0.250 and −250 mV from OCP. EIS measurements were carried out from OCP with an AC voltage amplitude of 10 mV and a frequency range of 100.000 to 0.01 Hz (ten points were measured for each decade of frequency). Free corrosion potential measurements were completed after 2 h and then polarization resistance was measured. Results indicated that corrosion rate of coated mild steel plate with developed composition was found to be 0.032 mmpy as against fly ash coated mild steel plate that showed the corrosion rate of 0.15 mmpy. $I_{corr}$ (A/cm$^2$) of coated mild steel plate with developed composition was found to be 2.5×10$^{-6}$ as against fly ash coated mild steel plate that showed the $I_{corr}$ (A/cm$^2$) value of 2.9×10$^{-5}$.

Example 4

For making tailored precursor material, fly ash (1650 gms), solid sodium hydroxide (200 gins), rice husk (37 gms), tricalcium phosphate (18.5 gms) and cetyl trimethyl ammonium bromide (37 gms) were dry grounded together using a ball mill for a period of 8 hours. The 200 gins of so obtained tailored precursor material was reacted with 100 ml water alone for development of coating material. The obtained coating material was coated on mild steel plates of size 40 mm×50 mm×1.04 mm by spray coating technique. The coated plates were dried at room temperature for a period of 6 hours and cured in an air oven at 60° C. for a period of 8 hours. Thereafter, the coated plates were removed from the hot air oven. The samples so obtained were tested for their, a) adhesion strength and b) corrosion studies. Adhesion studies were carried out using Elcometer 106 and Adhesion strength was found to be 1.0±0.2 MPa.

Corrosion studies were carried by weight loss method in 3.5% aqueous NaCl solution and corrosion rate of coated mild steel plate was found to be 2.06 mmpy as against uncoated mild steel that showed the corrosion rate of 7.51 mmpy.

The electrochemical measurements of coated specimens were performed by measuring variation of open circuit potential (OCP) ($E_{ocp}$) with time. Tafel polarization curves were plotted and electrochemical impedance spectroscopic (EIS) studies were carried out in a 3.5 weight % NaCl solution using CHI604C potentistat. The analyses were carried out at room temperature in a standard electrochemical cell equipped with a frequency response analyzer module. A three-electrode cell including a Platinum electrode as a counter electrode, sliver-silver chloride (Ag/AgCl) electrode as reference electrode and the specimens as a working electrode were used in the experiments. The Tafel polarization curves were obtained from potentiodynamic polarization at a constant scan rate 1 mV/s by sweeping the potential between +250 and −250 mV from OCP. EIS measurements were carried out from OCP with an AC voltage amplitude of 10 mV and a frequency range of 100.000 to 0.01 Hz (ten points were measured for each decade of frequency). Free corrosion potential measurements were completed after 2 h and then polarization resistance was measured. Results indicated that corrosion rate of coated mild steel plate with developed composition was found to be 0.086 mmpy as against fly ash coated mild steel plate that showed the corrosion rate of 0.15 mmpy. $I_{corr}$ (A/cm$^2$) of coated mild steel plate with developed composition was found to be 6.7×10$^{-6}$ as against fly ash coated mild steel plate that showed the $I_{corr}$ (A/cm$^2$) value of 2.9×10$^{-5}$.

Example 5

For making tailored precursor material, fly ash (1650 gms), solid sodium hydroxide (200 gms), rice husk (55.5 gms), tricalcium phosphate (18.5 gms) and cetyl trimethyl ammonium bromide (37 gms) were dry grounded together using a ball mill for a period of 8 hours. The 200 gms of so obtained tailored precursor material was reacted with 100 ml water alone for development of coating material. The obtained coating material was coated on mild steel plates of size 40 mm×50 mm×1.04 mm by spray coating technique. The coated plates were dried at room temperature for a period of 6 hours and cured in an air oven at 60° C. for a period of 8 hours. Thereafter, the coated plates were removed from the hot air oven. The samples so obtained were tested for their, a) adhesion strength and b) corrosion studies. Adhesion studies were carried out using Elcometer 106 and Adhesion strength was found to be 1.75±0.2 MPa.

Corrosion studies were carried by weight loss method in 3.5% aqueous NaCl solution and corrosion rate of coated mild steel plate was found to be 2.22 mmpy as against uncoated mild steel that showed the corrosion rate of 7.51 mmpy. The electrochemical measurements of coated specimens were performed by measuring variation of open circuit potential (OCP) ($E_{ocp}$) with time. Tafel polarization curves were plotted and electrochemical impedance spectroscopic (EIS) studies were carried out in a 3.5 weight % NaCl solution using CHI1604C potentiostat. The analyses were carried out at room temperature in a standard electrochemical cell equipped with a frequency response analyzer module. A three-electrode cell including a Platinum electrode as a counter electrode, sliver-silver chloride (Ag/AgCl) electrode as reference electrode and the specimens as a working electrode were used in the experiments. The Tafel polarization curves were obtained from potentiodynamic polarization at a constant scan rate 1 mV/s by sweeping the potential between +250 and −250 mV from OCP. EIS measurements were carried out from OCP with an AC voltage amplitude of 10 mV and a frequency range of 100.000 to 0.01 Hz (ten points were measured for each decade of frequency). Free corrosion potential measurements were completed after 2 h and then polarization resistance was measured. Results indicated that corrosion rate of coated mild steel plate with developed composition was found to be 0.064 mmpy as against fly ash coated mild steel plate that showed corrosion rate of 0.15 mmpy. $I_{corr}$ (A/cm$^2$) value coated mild steel plate with developed composition was found to be was found to be $5.0 \times 10^{-6}$ as against fly ash coated mild steel plate that showed $I_{corr}$ (A/cm$^2$) value of $2.9 \times 10^{-5}$.

Example 6

For making tailored precursor material, fly ash (1650 gms), solid sodium hydroxide (250 gms), rice husk (19 gms), tricalcium phosphate (19 gms) and cetyl trimethyl ammonium bromide (38 gms) were dry grounded together using a ball mill for a period of 8 hours. The 200 gms of so obtained tailored precursor material was reacted with 100 ml water alone for development of coating material. The obtained coating material was coated on mild steel plates of size 40 mm×50 mm×1.04 mm by spray coating technique. The coated plates were dried at room temperature for a period of 6 hours and cured in an air oven at 60° C. for a period of 8 hours. Thereafter, the coated plates were removed from the hot air oven. The samples so obtained were tested for their, a) adhesion strength and b) corrosion studies. Adhesion studies were carried out using Elcometer 106 and Adhesion strength was found to be 1.5±0.2 MPa.

Corrosion studies were carried by weight loss method in 3.5% aqueous NaCl solution and corrosion rate of coated mild steel plate was found to be 1.19 mmpy as against uncoated mild steel that showed the corrosion rate of 7.51 mmpy. The electrochemical measurements of coated specimens were performed by measuring variation of open circuit potential (OCP) ($E_{ocp}$) with time. Tafel polarization curves were plotted and electrochemical impedance spectroscopic (EIS) studies were carried out in a 3.5 weight % NaCl solution using CHI604C potentistat. The analyses were carried out at room temperature in a standard electrochemical cell equipped with a frequency response analyzer module. A three-electrode cell including a Platinum electrode as a counter electrode, sliver-silver chloride (Ag/AgCl) electrode as reference electrode and the specimens as a working electrode were used in the experiments. The Tafel polarization curves were obtained from potentiodynamic polarization at a constant scan rate 1 mV/s by sweeping the potential between +250 and −250 mV from OCP. EIS measurements were carried out from OCP with an AC voltage amplitude of 10 mV and a frequency range of 100.000 to 0.01 Hz (ten points were measured for each decade of frequency). Free corrosion potential measurements were completed after 2 h and then polarization resistance was measured. Results indicated that corrosion rate of coated mild steel plate with developed composition was found to be 0.080 mmpy as against fly ash coated mild steel plate that showed corrosion rate of 0.15 mmpy. $I_{corr}$ (A/cm$^2$) value of coated mild steel plate with developed composition was found to be $6.5 \times 10^{-6}$ as against fly ash coated mild steel plate that showed $I_{corr}$ (A/cm$^2$) value of $2.9 \times 10^{-5}$.

Advantages of the Present Invention

The developed nano phosphatic hybrid inorganic-organic geopolymeric corrosion resistant coating material is advantageous due to following reasons:
1) The geopolymeric coating material is prepared by a process based on solid state chemistry which involves development of coating material by adding water alone to tailored nano phosphatic hybrid inorganic-organic precursor obtained by together mechanico-chemical dry grinding of raw materials in appropriate combination and grinding duration, leading to synergistic and simultaneous solid state mechanico-chemical reactions among them, whereas, the conventional process of making coating material involves use of untailored raw materials and is based on solution chemistry.
2) The process of together mechanico-chemical dry grinding of the raw materials mix in solid powder form using conventional as well as by advanced machinery enables obtaining tailored nano phosphatic hybrid inorganic-organic precursor with desired functionality.
3) The developed process enables to tailor the functionalities by appropriate designing of combination of raw materials and grinding duration which helps in tailoring the properties of developed coating material for appropriate application spectrum.
4) The coating material obtained by process contain nano sized phosphatic compounds of quartz, mullite, hematite, sodium aluminium oxide, sodium aluminium silicate hydrate, sodium silicate, sodium aluminium silicate, α-d-glucose, sucrose, native cellulose and phenol, provides improved corrosion resistant properties and adhesion to the mild steel substrate.
5) The process enables in uniform distribution of reacting species resulting in formation of homogeneous matrix.
6) The coating material obtained possess anti corrosive and heat resistant properties.

The invention claimed is:

1. A nano phosphatic hybrid geopolymeric coating material comprising tailored precursor wherein the tailored precursor is obtained by together mechanico-chemical dry grinding of fly ash in an amount of 70 to 90% by wt., solid sodium hydroxide in an amount of 10 to 15% by wt., rice husk in an amount of 1 to 5% by wt., tri calcium phosphate in an amount of 1 to 5% by wt., cetyl trimethyl ammonium bromide in an amount of 2 to 5% by wt., and optionally sodium silicate in an amount of 5 to 7% by wt. and, said tailored precursor containing nano sized phosphatic compounds of Cancrisilite (sodium aluminium carbonate silicate hydrate), quartz, mullite, heamatite, sodium aluminium silicate, Herschelite (sodium aluminium silicate hydrate), sucrose, α-D-Glucose, native cellulose, and phenol.

2. The coating material of claim 1, wherein the material is obtained by adding water to the tailored precursor.

3. The coating material of claim 1, wherein the particle size of the nano phosphatic hybrid geopolymeric coating material is in the range of 37.1 to 53.7 nm.

4. The coating material of claim 1, wherein the nano phosphatic hybrid geopolymeric coating material has an adhesion strength in the range of 1.0-2.5 MPa.

5. The coating material of claim 1, wherein the nano phosphatic hybrid geopolymeric coating material has anti corrosive and heat resistant properties.

6. A corrosion and heat resistant substrate, wherein the substrate is coated with the coating material of claim 1.

7. A process for making nano phosphatic hybrid geopolymeric coating material, the process comprising:
   (i) mechanico-chemical dry grinding of:
   (a) fly ash in an amount of 70 to 90% by wt.,
   (b) solid sodium hydroxide in an amount of 10 to 15% by wt.,
   (c) rice husk in an amount of 1 to 5% by wt.,
   (d) tri calcium phosphate in an amount of 1 to 5% by wt.,
   (e) cetyl trimethyl ammonium bromide in an amount of 2 to 5% by wt., and
   (f) optionally sodium silicate in an amount of 5 to 7% by wt.; to obtain a tailored precursor; and
   (ii) reacting the tailored precursor with water to obtain the coating material.

8. The process of claim 7, wherein mechanico-chemical dry grinding is performed using a ball mill for a period ranging from 8 to 24 hours.

9. The process of claim 7, wherein the tailored precursor is reacted with water in a ratio of 1:3 to obtain the coating material.

10. A nano phosphatic hybrid geopolymeric coating material as obtained by the process of claim 7.

11. A corrosion and heat resistant coating material as obtained by the process of claim 7.

12. A corrosion and heat resistant substrate, wherein the substrate is coated with the coating material of claim 10.

13. A nano phosphatic hybrid geopolymeric coating material as obtained by reacting a tailored precursor with water, wherein the tailored precursor is obtained by together mechanico-chemical dry grinding of fly ash in an amount of 70 to 90% by wt., solid sodium hydroxide in an amount of 10 to 15% by wt., rice husk in an amount of 1 to 5% by wt., tri calcium phosphate in an amount of 1 to 5% by wt., cetyl trimethyl ammonium bromide in an amount of 2 to 5% by wt., and optionally sodium silicate in an amount of 5 to 7% by wt.

* * * * *